April 15, 1952 C. E. ZIMMERMANN 2,593,382

SANITARY TELEPHONE MOUTHPIECE ATTACHMENT

Filed June 23, 1950

INVENTOR.
CHARLES E. ZIMMERMANN
BY Zoltan Polachek
ATTORNEY

Patented Apr. 15, 1952

2,593,382

UNITED STATES PATENT OFFICE 2,593,382

SANITARY TELEPHONE MOUTHPIECE ATTACHMENT

Charles E. Zimmermann, North Arlington, N. J.

Application June 23, 1950, Serial No. 169,868

8 Claims. (Cl. 179—185)

This invention relates to attachments for speaker mouthpieces, and pertains particularly to a sanitary attachment for a telephone mouthpiece, whereby the transmission of germs or odors from one user to another is inhibited.

One object of the present invention is to provide a sanitary attachment for a telephone mouthpiece which is of simple construction and may be discarded and replaced cheaply when its effectiveness is ended.

Another object of the present invention is to provide a sanitary attachment for a telephone mouthpiece which contains an absorbent packing saturated with replenishable amounts of a germicide and deodorant.

Another object of the present invention is to provide a sanitary attachment for a telephone mouthpiece which contains a germicidal and deodorant impregnated packing which is hermetically sealed until the attachment is to be used.

Another object of the present invention is to provide sanitary attachments for telephones which are easily and securely attachable to the mouthpieces thereof.

Still another object of the present invention is to provide a portable sanitary attachment for telephone mouthpieces which may be carried on one's person and used when in contact with public and unprotected telephone instruments.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
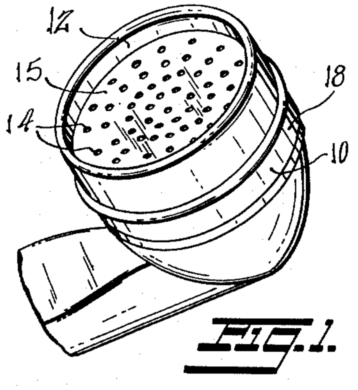
Fig. 1 is a perspective view of one embodiment of the present invention, illustrating the same applied to a telephone mouthpiece.
Figure 3:
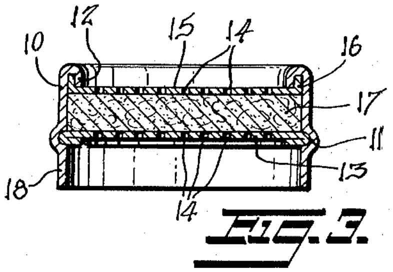
Fig. 3 is a sectional view taken along the lines 3—3 in Fig. 2, and illustrates constructional details of the first embodiment.
Figure 2:
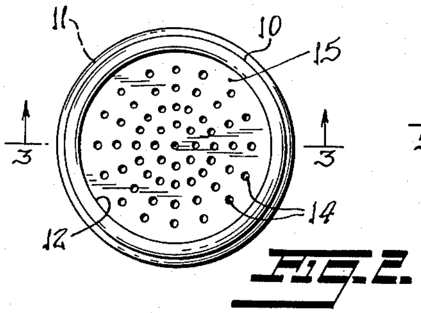
Fig. 2 is a plan view of the embodiment of Fig. 1.

The attachment for a telephone mouthpiece, according to the first form of the present invention shown in Figs. 1 to 3, includes a body member 10 of cylindrical form having an internal peripheral groove 11 and an internal and downwardly extending flanged upper edge 12. The body member 10 may be of any suitable material. However, since the present invention is intended primarily to be of cheap construction and cheaply replaceable, the body is preferably made of an easily workable type of heavy paper.

Provided to be securely fixed in said internal groove 11 as by gluing is a first disc 13, which includes a plurality of perforations 14. Said disc is also preferably of heavy paper. At the upper end of said cylindrical body 10 is a second disc 15 having a circumferential outwardly directed flange 16 secured, as by gluing also, in the aforementioned downwardly extending flanged edge 12. Said second disc is also provided with a plurality of perforations 14. Interposed between said first and second discs 13 and 15, respectively is a packing 17 which may be of any suitable material such as cotton wadding, surgical gauze, absorbent paper, etc. Said packing 17 is adapted to be saturated with both germicidal and deodorant solutions, which will be effective for destroying any germs and absorbing any unpleasant odors which may be in the immediate vicinity thereof.

Now, it will be seen that the diameter of the cylindrical body 10 is slightly less than that of the telephone mouthpiece over which it is to fit. Therefore, the lower portion 18 of said cylindrical body will fit over said mouthpiece only when it is forced thereon. As a result, the inherent elasticity of the material from which the cylinder is manufactured causes said cylinder to cling to said mouthpiece and thereby provide suitable means for securing the sanitary attachment thereon.

It will be understood, of course, that the just described embodiment need not be expandable. All of the cited elements may quite easily be manufactured of more durable materials, such as plastics or metals, and the saturated packing may be replaced or a permanent packing may be utilized and replenished with a germicide and a deodorant periodically.

Figure 4:
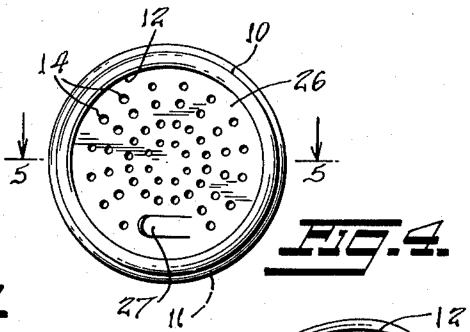
Fig. 4 is a plan view of a second embodiment of the present invention and shows the liftable tab in the rotatable top disc.
Figure 5:
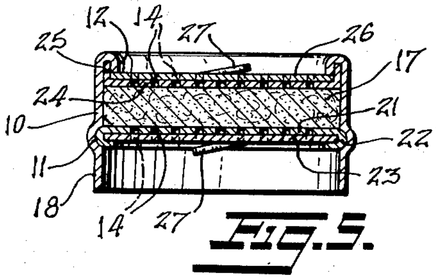
Fig. 5 is a sectional view taken along the lines 5—5 in Fig. 4, and illustrates the constructional details of the second embodiment.

Now, as seen in Figs. 4 and 5, a second embodiment provides means whereby it may be sealed until its use is desired. Herein, like the first described embodiment, there is provided a cylindrical body 10 having an internal peripheral groove 11 and an internal and downwardly extending flanged edge 12. A plurally perforated bottom member 21 having the circumferential edge 22 folded downwardly and inwardly is fixedly secured, as by gluing, in said peripheral groove 11, and an identically perforated bottom disc 23 is seated in said bottom member in such a manner as to be freely rotatable therein. At the top of said body is provided a plurally perforated top member 24 having an upwardly extending circumferential flange 25 which is secured in the aforementioned downwardly extending body flange 12. A top disc 26, plurally and identically perforated, is adapted to associate with said top member 24 and is rotatably disposed between said top member and said body flange 12. Also, both bottom and top discs 23 and 26, respectively, are configured to provide liftable tabs 27 for facilitating the rotations thereof. By means of this arrangement it is possible to include between the top and bottom members a germicidal and deodorant impregnated packing 17, which may be hermetically sealed therein during manufacture by simply rendering the perforations in the top disc 26 out of register with those in the top member and the perforations in the bottom disc 23 out of register with those in the bottom member 21.

When the attachment reaches a consumer and is ready to be used, the tabs 27 may be lifted and utilized to rotate said bottom and top discs 23 and 26, respectively, and thereby render the perforations therein in register with those of the said bottom and top members. Thus it is possible to retain the full strength of the germicide and deodorant in the packing 17 up until the time when it is required to be effective. This embodiment is attachable to a speaker mouthpiece in the same manner as the first embodiment.

Figure 6:
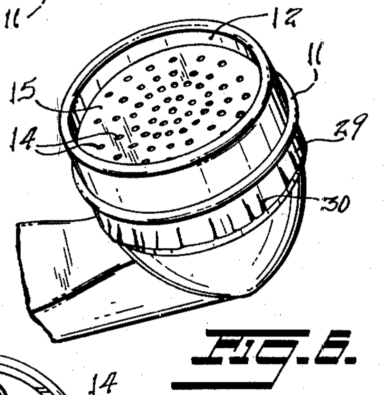
Fig. 6 is a perspective view of a third embodiment of the present invention, showing the manner in which the same is attachable to a telephone mouthpiece.

Both the first and second embodiments hereinabove described may be modified, as seen in Fig. 6, to provide a foil cylindrical body 29. Said body 29 may be a foil of any one of many suitable materials, such as lead, aluminum, etc. This modification enables the lower portion of the body 29 to be fitted over a speaker mouthpiece and to be thereafter crimped as at 30, to thereby fasten the attachment to said mouthpiece.

Figure 7:
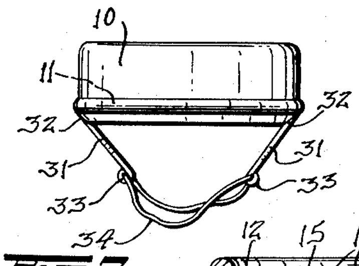
Fig. 7 is a side elevational view of a portable form of the present invention, showing means for attaching same to a telephone mouthpiece.
Figure 8:
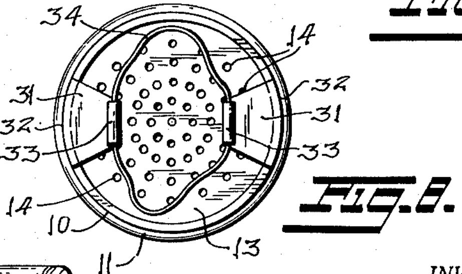
Fig. 8 is a bottom plan view of the portable form of the invention seen in Fig. 7.

The present invention may also be modified in such a manner as to render it foldable and portable, for being carried on one's person and resorted to when in contact with publicly used and unprotected telephone or similar device mouthpieces. Such a portable attachment may be identical to either of the described first and second embodiments in all respects except the lower portions of the cylindrical bodies 10. The lower portion of the body 10 in the present modification, as seen in Figs. 7 and 8, is configured to provide diametrally disposed and downwardly extending tab members 31, which tab members are inwardly foldable along the lines 32. Also, the extremes of said tab members are folded back as at 33 and held securely in each one thereof a portion of a common circuitous elastic member 34, such as a rubber band. This arrangement enables the attachment to assume a compact and readily portable state, and when the same is desired to be used the foldable tab members 31 may be easily extended and the elastic member 34 may be readily utilized for affixing said attachment to a telephone mouthpiece.

Figure 9:
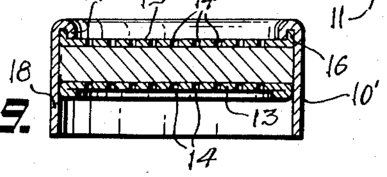
Fig. 9 is a vertical sectional view similar to Fig. 3, but illustrating the telephone mouthpiece attachment constructed in accordance with a still further modification of the present invention.

In the modification of the invention shown in Fig. 9, the construction of the telephone mouthpiece attachment is similar to that described in connection with Figs. 1 to 3, differing from that previous form in that the body member 10' is not formed with the peripheral groove 11, so that the body member is of uniform diameter through its length. The first disc 13 has a friction fit within the body member 10' and may be secured in position by the addition of a suitable adhesive 40 for retaining the packing 17 in position against the second disc 15.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An attachment for a telephone mouthpiece comprising, a cylindrical body open at one end to be slipped over the mouthpiece and having an internal peripheral groove substantially intermediate the ends, an inwardly extended flange at the other end of said body, a plurally perforated member having the circumferential edge thereof folded inwardly and fixedly secured in said peripheral groove, a first plurally perforated disc rotatably seated in said perforated member, a second plurally perforated member having an outwardly extending circumferential flange fixedly secured in said inwardly extending cylinder flange, a second plurally perforated disc rotatably disposed between said second perforated member and said cylinder flange, and an absorbent germicidal saturated packing interposed between said plurally perforated members.

2. A sanitary attachment for telephone mouthpieces comprising a cylindrical body open at one end to be slipped over the mouthpiece and having an internal peripheral groove substantially intermediate the ends, an inwardly extended flange at the other end of said body, a plurally perforated member having the circumferential edge thereof folded inwardly and fixedly secured in said peripheral groove, a first plurally and identically perforated disc rotatably seated in said perforated member, a second plurally perforated member having an outwardly extending circumferential flange fixedly secured in said inwardly extending cylinder flange, a second plurally and identically perforated disc rotatably disposed between said second perforated member and cylinder flange, said discs each having a liftable tab adapted to facilitate rotation thereof, and a germicidal impregnated packing interposed and hermetically sealed between said plurally perforated members when the disc perforations are out of register with perforations of said plurally perforated members.

3. A sanitary attachment for telephone mouthpieces comprising a cylindrical body open at one end to be slipped over the mouthpiece and having an internal peripheral groove substantially intermediate the ends, an inwardly extended flange at the other end of said body, a plurally perforated member having the circumferential edge thereof folded inwardly and fixedly secured in said peripheral groove, a first plurally and identically perforated disc rotatably seated in said perforated member, a second plurally perforated member having an outwardly extending circumferential flange fixedly secured in said inwardly extending cylinder flange, a second plurally and identically perforated disc rotatably disposed between said second perforated member and cylinder flange, said discs each having a liftable tab adapted to facilitate rotation thereof, and a germicidal impregnated packing interposed and hermetically sealed between said plurally perforated members when the disc perforations are out of register with perforations of said plurally perforated members, the said one open end of said cylindrical body being of a diameter slightly less than the diameter of the mouthpiece, whereby the said one open end is fitted forcibly on the mouthpiece and held thereon by the inherent elasticity of the material of said cylindrical body.

4. A sanitary attachment for a telephone mouthpiece comprising a cylindrical foil body open at one end to be slipped over the mouthpiece and having an internal peripheral groove substantially intermediate the ends, an inwardly extended flange at the other end of said body, a first plurally perforated disc disposed and fixed in said peripheral groove, a second plurally perforated disc having an outwardly extending circumferential flange disposed and fixed in said inwardly extending cylinder flange, and a germicidal saturated packing interposed between said first and second discs, the material of said foil body defining the said one open end being adapted to fit over the mouthpiece and be thereafter crimped, whereby the attachment is fastened on the mouthpiece.

5. In a portable sanitary attachment for a telephone mouthpiece, the combination of a cylindrical body open at one end to be slipped over the mouthpiece and having an internal peripheral groove adjacent the open end thereof, an inwardly extended flange at the other end of said body, a first plurally perforated disc disposed and fixed in said peripheral groove, a second plurally perforated disc having an outwardly extending circumferential flange disposed and fixed in said inwardly extending cylinder flange, a germicidal saturated packing interposed between said first and second discs, inwardly foldable tab members extending from the open end of said cylinder body, and a circuitous elastic member carried by said tab members, whereby the attachment may be fastened onto the mouthpiece.

6. In a portable sanitary attachment for a telephone mouthpiece, the combination of a cylindrical body open at one end to be slipped over the mouthpiece and having an internal peripheral groove adjacent the open end thereof, an inwardly extended flange at the other end of said body, a plurally perforated member having its circumferential edge folded inwardly and fixedly secured in said peripheral groove, a first plurally and identically perforated disc rotatably seated in said perforated member, a second plural perforated member having an outwardly extending circumferential flange fixedly secured in said inwardly extending cylinder flange, a second plurally and identically perforated disc rotatably disposed between said second perforated member and cylinder flange, said discs each being provided with a liftable tab adapted to facilitate rotation thereof, a germicidal impregnated packing interposed and hermetically sealed between said perforated members when the disc perforations are out of register with the perforations of said perforated members, inwardly foldable and diametrally disposed tab members extending from the open end of said cylinder body, and a circuitous elastic band carried by said tab members, whereby the attachment may be fastened on the mouthpiece.

7. An attachment for a telephone mouthpiece, comprising a cylindrical body open at one end to be slipped over said mouthpiece and having an inwardly extended flange at its other end, a perforated disc positioned in said cylindrical body against said flange, a germicidal saturated packing positioned in said cylindrical body against said perforated disc, and a second perforated disc positioned in said cylindrical body against said packing.

8. An attachment for a telephone mouthpiece comprising a cylindrical body open at one end to be slipped over said mouthpiece and having an inwardly extended flange at its other end, a perforated disc positioned in said cylindrical body against said flange, a germicidal saturated packing positioned in said cylindrical body against said perforated disc, a second perforated disc positioned in said cylindrical body against said packing, said second-mentioned perforated disc having a friction fit in said cylindrical body, and an adhesive further assisting in retaining said second-mentioned perforated disc in position in said cylindrical body.

CHARLES E. ZIMMERMANN.

REFERENCES CITED

The following references are of record in the file of this patent:

UNITED STATES PATENTS

| Number | Name | Date |
|---|---|---|
| 1,048,394 | Dickinson | Dec. 24, 1912 |
| 1,140,954 | Collins | May 25, 1915 |
| 1,256,003 | Federman | Feb. 12, 1918 |
| 1,493,557 | Meadoff | May 13, 1924 |

FOREIGN PATENTS

| Number | Country | Date |
|---|---|---|
| 41,015 | Denmark | Oct. 19, 1929 |